US008500082B2

(12) United States Patent (10) Patent No.: US 8,500,082 B2
Lee (45) Date of Patent: Aug. 6, 2013

(54) SEAT BASE SLIDING APPARATUS

(75) Inventor: Dong Kyu Lee, Incheon (KR)

(73) Assignee: Doosan Infracore Co., Ltd., Incheon (KR)

( * ) Notice: Subject to any disclaimer, the term of this patent is extended or adjusted under 35 U.S.C. 154(b) by 0 days.

(21) Appl. No.: 13/142,150

(22) PCT Filed: Dec. 21, 2009

(86) PCT No.: PCT/KR2009/007633
§ 371 (c)(1),
(2), (4) Date: Jun. 24, 2011

(87) PCT Pub. No.: WO2010/074467
PCT Pub. Date: Jul. 1, 2010

(65) Prior Publication Data
US 2011/0253873 A1 Oct. 20, 2011

(30) Foreign Application Priority Data

Dec. 24, 2008 (KR) .......................... 10-2008-0133990

(51) Int. Cl.
*F16M 13/00* (2006.01)
(52) U.S. Cl.
USPC ................... 248/424; 297/344.24; 296/65.11; 296/26.12
(58) Field of Classification Search
USPC ........ 248/424; 297/344.1, 344.24; 296/65.13, 296/65.14, 65.11, 26.12
See application file for complete search history.

(56) References Cited

U.S. PATENT DOCUMENTS 5,161,765 A * 11/1992 Wilson .......................... 248/425
5,740,563 A * 4/1998 Gaddy ............................ 4/579

(Continued)

FOREIGN PATENT DOCUMENTS

CN 2797452 Y 7/2006
CN 1980810 A 6/2007

(Continued)

OTHER PUBLICATIONS

Search Report dated Jun. 25, 2010 for International Application No. PCT/KR2009/007633 filed Dec. 21, 2009.

(Continued)

*Primary Examiner* — Bradley Duckworth
(74) *Attorney, Agent, or Firm* — John D. Veldhuis-Kroeze; Westman, Champlin & Kelly, P.A.

(57) ABSTRACT

The present disclosure discloses a seat base sliding device applied to a seat of a heavy machinery such as a loader, an excavator, or the like. The seat base sliding device includes: a seat base with a lower part is fixed to a floor of a vehicle body and an upper part at which a seat is installed; a sliding plate slidable inwards and outwards in a lateral direction of the seat base at both left and right sides of the seat base and in which a control stand is fixed to one side thereof; and at least one adjustment unit selectively fixing the sliding plate of which the position is determined by sliding movement to the seat base. The present disclosure is capable of preventing a cabin from knocking against both control stands of a seat device at the time of assembling the cabin around the seat device and in addition, preventing the corresponding control stands from interfering in a thigh of a driver at the time of operating a control lever of each control stand laterally after assembling the cabin.

3 Claims, 4 Drawing Sheets

U.S. PATENT DOCUMENTS

| | | | |
|---|---|---|---|
| 6,609,745 B2 * | 8/2003 | Miyahara et al. | 296/65.11 |
| 2006/0220411 A1 * | 10/2006 | Pathak et al. | 296/65.11 |
| 2007/0170743 A1 * | 7/2007 | Kinoshita et al. | 296/65.13 |
| 2009/0021064 A1 * | 1/2009 | Shao | 297/344.1 |
| 2011/0187146 A1 * | 8/2011 | Lindsay | 296/65.11 |

FOREIGN PATENT DOCUMENTS

| | | |
|---|---|---|
| JP | 62-131833 | 6/1987 |
| KR | 10-1998-0022034 A | 6/1998 |
| KR | 20040002713 A | 7/2004 |
| WO | 2005-012030 A1 | 2/2005 |
| WO | 2006017633 A1 | 2/2006 |

OTHER PUBLICATIONS

Office Action dated Jan. 29, 2013 for Chinese Patent Application No. 200980152172.8, 5 pages.

* cited by examiner

Prior Art

US 8,500,082 B2

SEAT BASE SLIDING APPARATUS

This Application is a Section 371 National Stage Application of International Application No. PCT/KR2009/007633, filed Dec. 21, 2009 and published, not in English, as WO2010/074467 on Jul. 1, 2010, which is herein incorporated by reference in its entirety.

FIELD OF THE DISCLOSURE

The present disclosure relates to a seat base sliding device applied to a seat of a heavy machinery such as a loader, an excavator, or the like, and more particularly, to a seat base sliding device capable of preventing a cabin from interfering with control stands disposed at both left and right sides of a seat at the time of assembling the cabin or control levers at both left and right sides from interfering with a corresponding thigh of a driver at the time of adjusting the control levers laterally after assembling the cabin.

BACKGROUND OF THE DISCLOSURE

In general, a loader is widely used to perform an excavating operation for excavating soil, sand, and the like, a transporting operation for transporting the excavated soil and sand, a loading and unloading operation for loading or unloading the transported soil and sand to or from a truck, a road leveling operation, a snow-removing operation, a towing operation, and the like in construction sites.

The loader is configured in a structure including a boom installed at the front side of a vehicle and operated by a boom cylinder and a bucket rotatably fixed to the front end of the boom and operated by a bucket cylinder.

An excavator performs various operations such as excavation, earth leveling, earth tramping, lifting of a heavy object, and the like. A working machine of the excavator is constituted by a boom, an arm, and a bucket and an operation of the excavator is performed by controlling the working machine constituted by the boom, arm, and bucket through each corresponding hydraulic cylinder.

FIG. 1 is a schematic perspective view showing a state in which a cabin is assembled to a seat device of an excavator in the related art.

The seat device 1 in the related art includes a suspension assembly 2 mounted on a floor (not shown) of a vehicle body, a seat base 3 installed in the top of the suspension assembly 2, and a seat 4 fixed to the top of the seat base 3.

Herein, control stands 5 are provided at both left and right sides of the seat base 3 and each control stand 5 includes a control lever 6.

Since the seat base 3 of the seat device 1 in the related art is fixed at an initial mounting position, inconvenience in which interference between each control stand 5 and a thigh of a driver occurs is accompanied at the time of controlling the control lever 6 on each control stand 5 from the left side to the right side after assembling.

Meanwhile, as shown in FIG. 1, the cabin 7 (alternatively, an operating room structure) is assembled down from the top to the bottom around the seat device 1 configured as above.

However, the size of the general cabin is defined by law for safety and there is a limit to ensure a drive space of the driver described above by the cabin having the limited size. Therefore, in the related art, as described above, a method of assembling the cabin 7 after disposing the control stand 5 at the outermost side of the seat device 1 by considering the driver's space may be adopted. However, in this case, the cabin 7 knocks against both control stands 5 of the seat device 1 during assembling, and as a result, the corresponding control stand is frequently damaged. That is, in the related art, the drive space could not be sufficiently ensured due to safety and part breakage in spite of user needs.

The discussion above is merely provided for general background information and is not intended to be used as an aid in determining the scope of the claimed subject matter.

SUMMARY

This summary and the abstract are provided to introduce a selection of concepts in a simplified form that are further described below in the Detailed Description. The summary and the abstract are not intended to identify key features or essential features of the claimed subject matter, nor are they intended to be used as an aid in determining the scope of the claimed subject matter.

Therefore, the present disclosure is contrived to solve the above-mentioned problems. An object of the present disclosure is to provide a seat base sliding device capable of preventing a control stand from being damaged by a cabin at the time of assembling the cabin around a seat device.

Another object of the present disclosure is to provide a seat base sliding device capable of preventing interference between a control lever and a thigh of a driver at the time when a driver controls the control lever after assembling the cabin.

In order to achieve the objects, the present disclosure provides a seat base sliding device including: a seat base with a lower part is fixed to a floor of a vehicle body and an upper part at which a seat is installed; a sliding plate slidable inwards and outwards in a lateral direction of the seat base at both left and right sides of the seat base and in which a control stand is fixed to one side thereof; and at least one adjustment unit selectively fixing the sliding plate of which the position is determined by sliding movement to the seat base.

Further, the present disclosure further provides the following detailed exemplary embodiments in regards to the exemplary embodiment of the present disclosure.

According to the exemplary embodiment of the present disclosure, each adjustment unit may include the seat base having a through hole, the sliding plate having a slot extending laterally, and an adjustment member penetrating the slot of the sliding plate to fit in the through hole of the seat base, and the adjustment member may press at least one of the seat base and the sliding plate and is selectively fixed thereto to selectively maintain an interpressing state of the seat base and the sliding plate.

According to the exemplary embodiment of the present disclosure, the seat base sliding device may include: a screw section formed at one side of each adjustment member; a nut fixed to a lower part of the through hole and coupled with the screw section; and a cap nut further coupled with the end of the screw section penetrating the nut when the screw section and the nut are coupled with each other to set an opening limit of the adjustment member.

According to the exemplary embodiment of the present disclosure, the sliding plate may include a horizontal section fixed to each of both left and right sides of the seat base through at least one adjustment unit and an inclined section slantly connected with the horizontal section, and the control stand is connected to one side of the inclined section.

The present disclosure enables each control stand to move to the inside of a seat device through a sliding unit of the seat device to thereby prevent a cabin from knocking against both control stands of the seat device at the time of assembling the cabin around the seat device.

Further, the present disclosure enables each control stand to move to a corresponding inner wall of the cabin through the sliding unit of the seat device to thereby prevent interference between the corresponding control stand and a thigh of a driver at the time of operating a control lever of each control stand from the left side to the right side after assembling.

DETAILED DESCRIPTION

Hereinafter, an exemplary embodiment of a seat base sliding device according to the present disclosure will be described below with reference to FIGS. 2 to 6.

Figure 1:
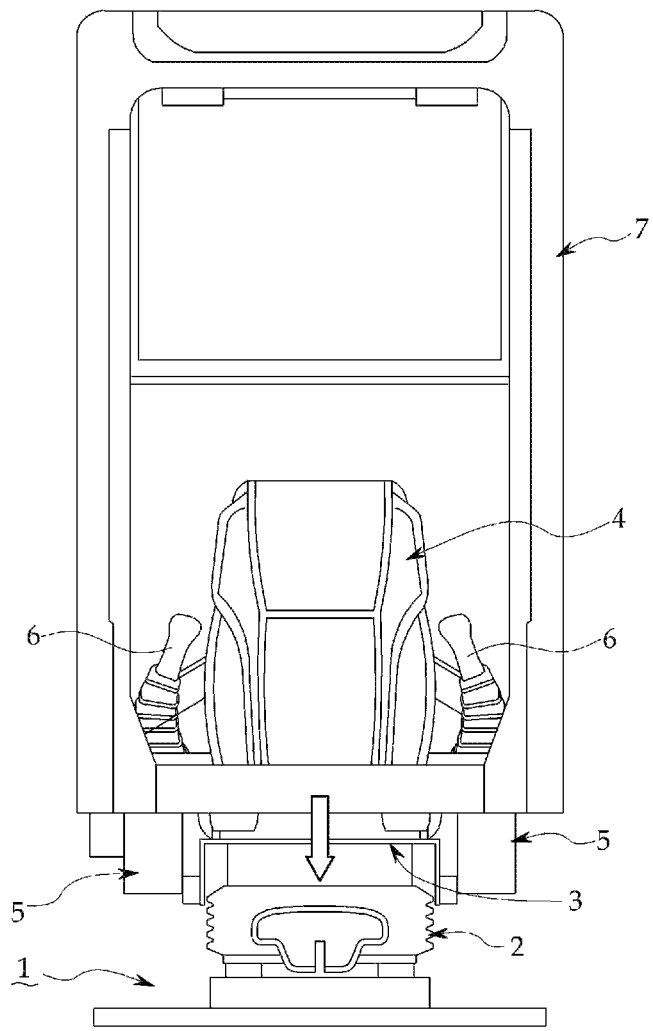
FIG. 1 is a schematic perspective view showing a state in which a cabin is assembled to a seat device of an excavator in the related art.
Figure 2:
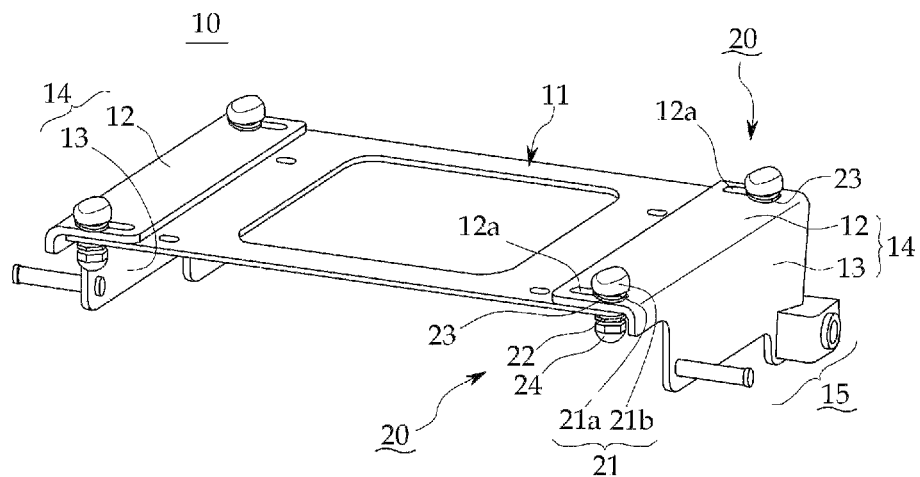
FIG. 2 is a schematic perspective view showing a seat base sliding device according to the present disclosure.
Figure 3:
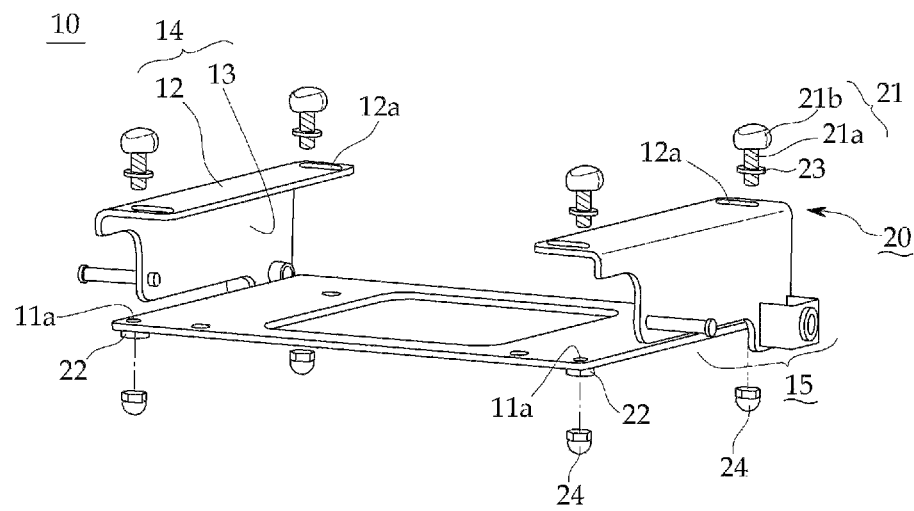
FIG. 3 is a schematic exploded perspective view showing a seat base sliding device according to the present disclosure.
Figure 4:
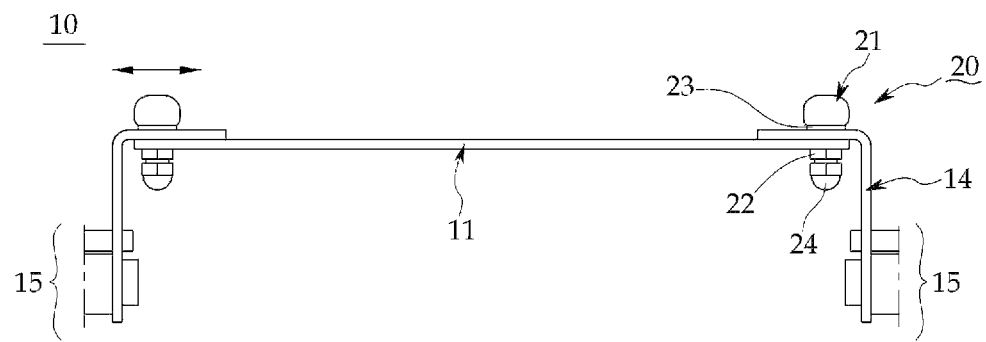
FIG. 4 is a schematic front view showing a seat base sliding device according to the present disclosure.
Figure 5:
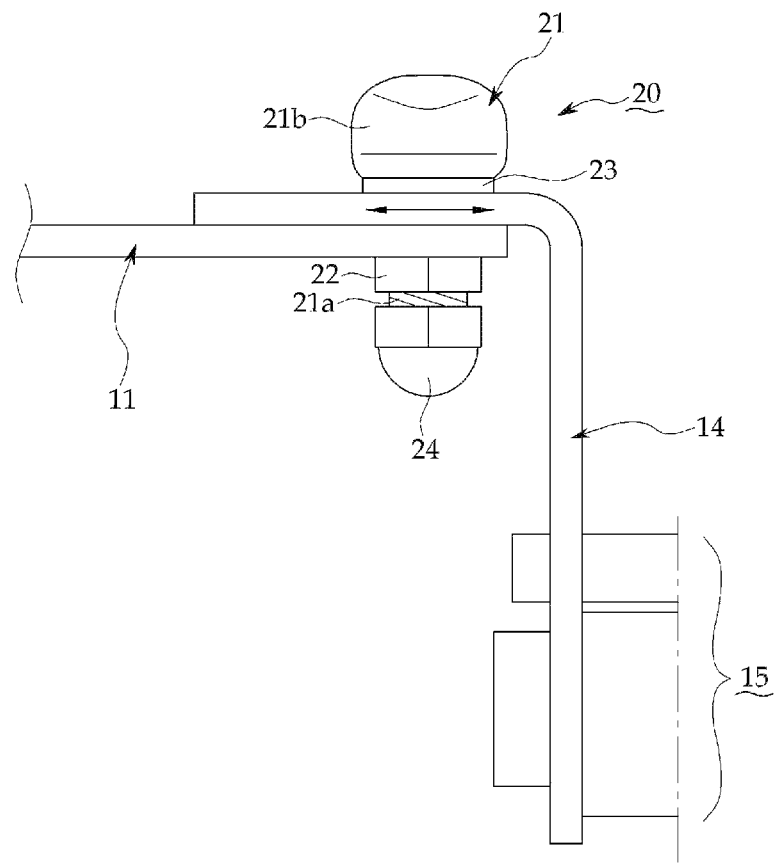
FIG. 5 is a schematic enlarged diagram showing an adjustment unit of a seat base sliding device according to the present disclosure.

FIG. 2 is a schematic perspective view showing a seat base sliding device according to the present disclosure and FIG. 3 is a schematic exploded perspective view showing a seat base sliding device according to the present disclosure. Further, FIG. 4 is a schematic front view showing a seat base sliding device according to the present disclosure and FIG. 5 is a schematic enlarged diagram showing an adjustment unit of a seat base sliding device according to the present disclosure.

In the following description of the present disclosure, the same reference numerals as those in the related art will refer to the same components as those in the related art for easy understanding.

The seat base sliding device 10 according to the present disclosure may include a seat base 11 in which a suspension assembly (not shown) installed on a floor (not shown) of a vehicle body is fixed to a lower part thereof and a seat (not shown) is installed in an upper part thereof, and a sliding plate 14 including a horizontal section 12 fixed to each of both left and right sides of the seat base 11 through at least one adjustment unit 20 and an inclined section 13 slantly connected with the horizontal section 12 and each one side connected with a control stand (not shown) through a fixation unit 15, and being slidable inwards and outwards in a lateral direction of the seat base 11, as shown in FIGS. 2 and 3.

As known through the above configuration, in the seat base sliding device 10 according to the present disclosure, two or four adjustment unit 20 may be installed between the seat base 11 and the sliding plate 14 and the figures (FIGS. 2 and 3) of the present disclosure show a state in which four adjustment unit 20 is installed between the seat base 11 and the sliding plate 14. When the number of the adjustment unit 20 is two, a guide section (not shown) is preferably provided integrally or separately at both sides of the seat base 11 to guide the sliding plate 14 inwards and outwards in the lateral direction of the seat base 11. In a structure in which the guide section is formed integrally with the seat base 11, the guide section may be bent such that a corresponding side portion of the seat base 11 configures a guide rail.

Meanwhile, the "horizontal section 12" of the sliding plate 14 may have a shape so that the horizontal section 12 is slidable in the lateral direction of the seat base 11 and the "inclined section 13" may be slantly connected to the horizontal section 12 so that an installation space of the control stand can be maximally ensured between an inner wall of a cabin (not shown) and the inclined section. In the exemplary embodiment, as one example, the inclined section 13 has a shape extending substantially in a vertical direction to the horizontal section. It is preferable that the inclined section 13 is formed integrally with the horizontal section to improve processing efficiency thereof.

By the horizontal section 12 and the inclined section 13, utilizing optimal space can be expected when connecting the control stand 5 to the seat base 11.

Further, the seat base sliding device according to the present disclosure may be further limited to the following detailed exemplary embodiments in addition to the above-mentioned basic configuration.

Each adjustment unit 20 may include the seat base 11 having a through-hole 11a, the horizontal section 12 of the sliding plate 14 having a slot 12a extending in the lateral direction, an adjustment member 21 including a screw section 21a fitted through the slot 12a of the horizontal section 12 and the through-hole 11a of the seat base 11 and a head portion 21b formed integrally with the screw section, and a nut 22 fixed to a lower part of each through-hole 11a of the seat base 11, as shown in FIGS. 3 to 5.

A washer 23 may be further fitted in the screw section 12a between the head portion 21b of each adjustment member 21 and the horizontal section 12 of the sliding plate 14 to increase adhesive strength between the horizontal section 12 and the seat base 11 (see FIGS. 4 and 5).

A cap nut 24 may be further provided at a lower end of the screw section 21a of each adjustment member 21 so as to set an opening limit of the adjustment member 21 (see FIGS. 4 and 5).

Meanwhile, each fixation unit 15 may be configured as various types of known unit that can fix the corresponding control stand (not shown) to each inclined section 13 of the sliding plate 14.

An operation of the seat base sliding device configured as described above will be described below with reference to FIGS. 2 to 6.

Figure 6:
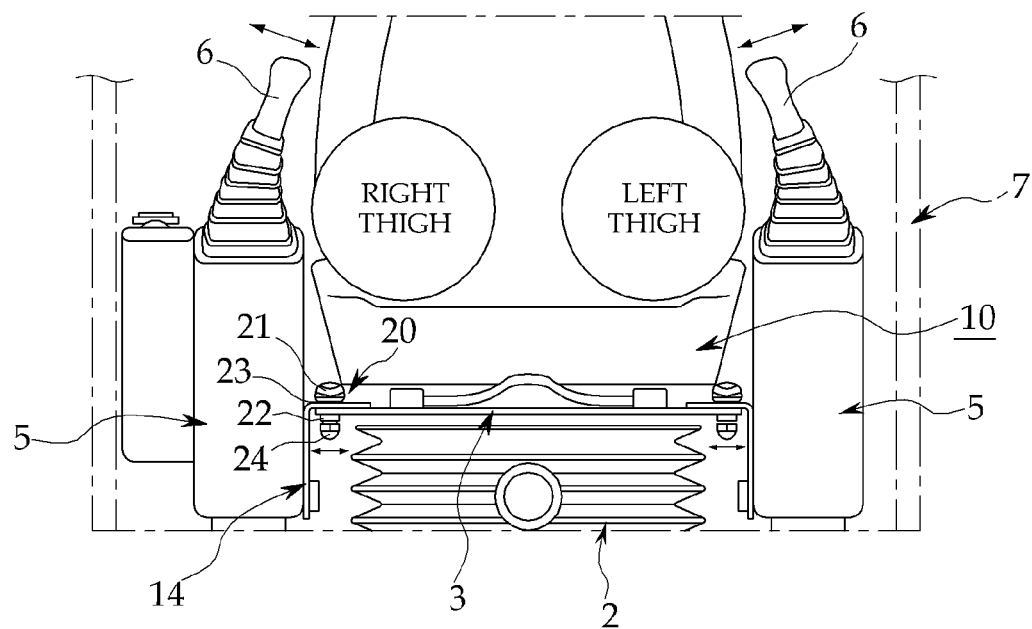
FIG. 6 is a schematic use state diagram of a seat base sliding device according to the present disclosure.

First, as shown in FIG. 6, when the cabin 7 is assembled around the seat base sliding device 10, the adjustment member 21 of the adjustment unit 20 provided at each of both sides of the seat base 11 is turned in a releasing direction and thereafter, the corresponding sliding plate 14 moves to the inside of the seat base 11.

In this case, the control stand 5 provided at the side of each sliding plate 14 also moves toward the center of the seat base 11 along the corresponding sliding plate. Further, in the case of the exemplary embodiment in which the cap nut 24 is further adopted at the lower end of the screw section 21a of the adjustment member 21, releasing of the adjustment member 21 is limited to a predetermined opening limit by the cap nut 24 (see FIGS. 2 to 5).

Thereafter, the cabin 7 moves down from the top to the bottom around the seat base sliding device 10 and is fixed to the floor (not shown) of the vehicle body with fasteners such as a screw, a bolt, and the like, and thereafter, each sliding plate 14 moves to the corresponding inner wall of the cabin 7 (see FIG. 6).

Subsequently, the adjustment member 21 of each adjustment unit 20 is turned in a fastening direction to fix the corresponding sliding plate 14 to the seat base 11. In this case, the control stand 5 fixed to the side of each sliding plate 14 also moves to the inner wall of the cabin 7 together with the corresponding sliding plate, such that a gap between the control stands 5 is widened. As a result, a space between the control lever 6 of each control stand 5 and a thigh of a driver can be significantly secured (see FIG. 6).

The above-mentioned present disclosure is not limited to the above-mentioned exemplary embodiment and the accompanying drawings and it is apparent to those skilled in the art that simple substitutions, modifications, and changes can be made within the spirit of the present disclosure.

The invention claimed is:

1. A seat base sliding device, comprising:
    a seat base including a lower part fixed to a floor of a vehicle body and an upper part fixed to a seat;
    a sliding plate, which a control stand is fixed to one side thereof, located on left and right sides of the seat base and slid according to a lateral direction of the seat base; and
    at least one adjustment unit selectively fixing the sliding plate to the seat base at a certain position determined by sliding movement of the sliding plate, wherein;
    the sliding plate includes a horizontal section fixed to each of both left and right sides of the seat base through at least one adjustment unit and an inclined section slantly connected with the horizontal section, and the control stand is connected to one side of the inclined section.

2. The seat base sliding device according to claim 1, wherein each adjustment unit includes the seat base having a through hole, the sliding plate having a slot extending laterally, and an adjustment member penetrating the slot of the sliding plate to fit in the through hole of the seat base, and
    the adjustment member selectively presses at least one of the seat base and the sliding plate and is fixed thereto to selectively maintain an interpressing state of the seat base and the sliding plate.

3. The seat base sliding device according to claim 2, further comprising:
    a screw section a formed at one side of each adjustment member;
    a nut fixed to a lower part of the through hole and coupled with the screw section; and
    a cap nut further coupled with the end of the screw section penetrating the nut when the screw section and the nut are coupled with each other to set an opening limit of the adjustment member.

* * * * *